(12) United States Patent
Jiang et al.

(10) Patent No.: US 12,063,557 B2
(45) Date of Patent: Aug. 13, 2024

(54) SIGNAL RESOURCE MEASUREMENT METHOD AND TERMINAL

(71) Applicant: VIVO MOBILE COMMUNICATION CO., LTD., Chang'an Dongguan (CN)

(72) Inventors: Dajie Jiang, Chang'an Dongguan (CN); Xueming Pan, Chang'an Dongguan (CN); Xiaodong Shen, Chang'an Dongguan (CN); Kai Wu, Chang'an Dongguan (CN); Li Chen, Chang'an Dongguan (CN); Qianyao Ren, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 498 days.

(21) Appl. No.: 17/350,592

(22) Filed: Jun. 17, 2021

(65) Prior Publication Data

US 2021/0314829 A1 Oct. 7, 2021

Related U.S. Application Data

(63) Continuation of application No. PCT/CN2019/122636, filed on Dec. 3, 2019.

(30) Foreign Application Priority Data

Dec. 17, 2018 (CN) .......................... 201811543985.7

(51) Int. Cl.
*H04W 4/00* (2018.01)
*H04W 36/00* (2009.01)
*H04W 36/30* (2009.01)

(52) U.S. Cl.
CPC ... *H04W 36/0058* (2018.08); *H04W 36/0072* (2013.01); *H04W 36/00837* (2018.08); *H04W 36/30* (2013.01)

(58) Field of Classification Search
CPC ......... H04W 36/0058; H04W 36/0072; H04W 36/00837; H04W 36/30; H04W 36/0094;
(Continued)

(56) References Cited

U.S. PATENT DOCUMENTS 9,462,559 B2    10/2016   Shen et al.
9,713,027 B2 *   7/2017   Jung ..................... H04W 24/10
(Continued)

FOREIGN PATENT DOCUMENTS

CN    101437262 A    5/2009
CN    101572902 A    11/2009
(Continued)

OTHER PUBLICATIONS

Extended European Search Report related to Application No. 19900935.8; reported Jan. 18, 2022.
(Continued)

*Primary Examiner* — Chuong T Ho
(74) *Attorney, Agent, or Firm* — von Briesen & Roper, s.c.

(57) ABSTRACT

A signal resource measurement method and a terminal are provided. The method includes: measuring a first signal resource of a target cell, to obtain a first measurement; and when the first measurement satisfies a first preset condition, measuring a second signal resource of the target cell, to obtain a second measurement; where the second signal resource is different from the first signal resource.

20 Claims, 2 Drawing Sheets

(58) Field of Classification Search
CPC ............. H04W 48/16; H04W 52/0245; H04W 52/0209; H04W 24/08; H04W 24/10; H04B 17/309; Y02D 30/70
USPC .......................................................... 370/331
See application file for complete search history.

(56) References Cited

U.S. PATENT DOCUMENTS

| | | | |
|---|---|---|---|
| 10,784,940 B2* | 9/2020 | Tang | .................... H04L 5/0048 |
| 2008/0189360 A1 | 8/2008 | Kiley | |
| 2009/0274123 A1 | 11/2009 | Chang | |
| 2011/0285804 A1 | 11/2011 | Esumi | |
| 2014/0043998 A1 | 2/2014 | Wang | |
| 2015/0079972 A1 | 3/2015 | Drazynski et al. | |
| 2015/0136996 A1 | 5/2015 | Inada | |
| 2019/0081688 A1 | 3/2019 | Deeno | |
| 2019/0261448 A1 | 8/2019 | Hu | |
| 2019/0319690 A1* | 10/2019 | Tang | ................. H04B 17/336 |
| 2019/0319696 A1* | 10/2019 | Buer | ................. H04B 7/18517 |
| 2019/0380053 A1* | 12/2019 | Bai | ..................... H04B 7/0632 |
| 2020/0014428 A1 | 1/2020 | Chen | |
| 2020/0022004 A1 | 1/2020 | Liu | |
| 2020/0107337 A1* | 4/2020 | Lin | ..................... H04L 1/0026 |
| 2020/0169896 A1 | 4/2020 | Li | |
| 2021/0067288 A1* | 3/2021 | Kakishima | .............. H04L 5/005 |
| 2021/0112465 A1 | 4/2021 | Zhang | |
| 2021/0119680 A1* | 4/2021 | Matsumura | ........... H04W 80/02 |
| 2021/0321298 A1* | 10/2021 | Keskitalo | .............. H04W 36/36 |
| 2021/0376894 A1* | 12/2021 | Cha | ...................... H04B 7/0695 |
| 2022/0408298 A1* | 12/2022 | Cui | ........................ H04B 7/022 |

FOREIGN PATENT DOCUMENTS

| | | |
|---|---|---|
| CN | 101835254 A | 9/2010 |
| CN | 103281789 A | 9/2013 |
| CN | 105188074 A | 12/2015 |
| CN | 106851675 A | 6/2017 |
| CN | 106982453 A | 7/2017 |
| CN | 107948919 A | 4/2018 |
| CN | 108377536 A | 8/2018 |
| CN | 108632838 A | 10/2018 |
| CN | 108633045 A | 10/2018 |
| CN | 108702180 A | 10/2018 |
| CN | 108810920 A | 11/2018 |
| EP | 2693810 A1 | 4/2012 |
| WO | 2013166709 A1 | 11/2013 |
| WO | 2018127395 A1 | 7/2018 |
| WO | 2018171654 A1 | 9/2018 |

OTHER PUBLICATIONS

European Search Report 2693810A4 dated Mar. 19, 2014.
PCT International Search Report and Written Opinion for PCT/CN2019/122636, dated Mar. 12, 2019.
First Office Action from Chinese Patent Office for related Chinese application 201811543985.7, dated Jan. 1, 2019.

* cited by examiner

SIGNAL RESOURCE MEASUREMENT METHOD AND TERMINAL

CROSS-REFERENCE OF RELATED APPLICATION

This application is continuation application of PCT International Application No. PCT/CN2019/122636 filed on Dec. 3, 2019, which claims priority to Chinese Patent Application No. 201811543985.7 filed in China on Dec. 17, 2018, the disclosures of which are incorporated in their entireties by reference herein.

TECHNICAL FIELD

The present disclosure relates to the field of communications technologies, and in particular, to a signal resource measurement method and a terminal.

BACKGROUND

In a $5^{th}$ generation (5G) new radio (NR) system, the bandwidth of the frequency range 1 (FR1, that is, the band below 6 GHz) needs to support a minimum of 100 MHz, for example, the bandwidth of the 3.5 GHz band is 80 MHz or 100 Mhz. The transmit power of a network device needs to cover the entire downlink bandwidth (such as 80 MHz or 100 MHz), and a synchronization signal broadcast block (Synchronization Signal and PBCH Block, SS/PBCH Block, or SSB) needs to occupy 20 resource blocks (RB) in frequency domain. When a sub-carrier spacing (SCS) is 30 KHz, the bandwidth occupied by 20 RBs is 7.2 MHz. Because transmit power of a network device needs to cover the entire downlink bandwidth, the transmit power that can be allocated to the SSB (7.2 MHz) is limited. Even if the power boosting technology is considered, the power spectral density of the SSB is still relatively limited, which affects the downlink coverage of the SSB.

To improve the downlink coverage of the SSB in FR1, the network device can configure multiple SSBs, and each SSB can be time-division multiplexed. For example, two SSBs are configured for each cell, and the beam coverage area corresponding to each SSB is 50% of the entire cell coverage area, so that two SSBs can cover the entire cell area through time division multiplexing.

Further, the 5G NR system supports a radio resource control (RRC) connected state, an idle state, and an inactive state. In the RRC connected state, the network device configures multiple SSBs available for measurement or channel state information reference signals (CSI-RS), and the terminal performs radio resource management (RRM) measurement on these multiple SSBs/CSI-RSs, and reports measurement results of N SSBs/CSI-RSs, such as identifiers of N strongest reference signals and their received power (Reference Signal Received Power, RSRP). Because the coverage ranges of different SSBs/CSI-RSs among these multiple SSBs/CSI-RSs may not overlap and the terminal may only be within the effective coverage range of one of the SSBs/CSI-RSs, if the terminal measures all of these multiple SSBs/CSI-RSs, the terminal consumes much power.

In the RRC idle state or inactive state, the terminal measures multiple beams configured by the network device and calculates the quality of a current cell according to measurements of these multiple beams, and starts measurement of a neighboring cell only when the quality of the current cell (such as RSRP) satisfies a condition. Even if the terminal determines that the terminal is not within coverage areas of some of the multiple beams, the terminal still needs to measure these beams, which causes additional power consumption of the terminal.

SUMMARY

Embodiments of the present disclosure provide a signal resource measurement method and a terminal.

According to a first aspect, an embodiment of this disclosure provides a signal resource measurement method, applied to a terminal. The method includes:
 measuring a first signal resource of a target cell, to obtain a first measurement; and
 when the first measurement satisfies a first preset condition, measuring a second signal resource of the target cell, to obtain a second measurement; where the second signal resource is different from the first signal resource.

According to a second aspect, an embodiment of the present disclosure further provides a terminal, including:
 a first measurement module, configured to measure a first signal resource of a target cell, to obtain a first measurement; and
 a second measurement module, configured to: when the first measurement satisfies a first preset condition, measure a second signal resource of the target cell, to obtain a second measurement; where the second signal resource is different from the first signal resource.

According to a third aspect, an embodiment of the present disclosure provides a terminal, where the terminal includes a processor, a memory; and a program stored in the memory and executable on the processor, and when the program is executed by the processor, the steps of the foregoing signal resource measurement method are implemented.

According to a fourth aspect, an embodiment of the present disclosure provides a computer-readable storage medium, with a program stored thereon, where when the program is executed by a processor, the steps of the foregoing signal resource measurement method are implemented.

In this way, when the terminal of the embodiments of the present disclosure measures the target cell, the terminal first measures the first signal resource of the target cell. Only when the measurement of the first signal resource satisfies the preset condition, the terminal measures the second signal resource of the target cell. If the measurement of the first signal resource does not satisfy the preset condition, there is no need to measure another signal resource. This can reduce the number of measured signal resources of the target cell, thereby reducing energy consumption of the terminal.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings.

DETAILED DESCRIPTION OF EMBODIMENTS

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to understand this disclosure more thoroughly and allow a person skilled in the art entirely comprehend the scope of this disclosure.

The terms "first", "second", and the like in this specification and claims of the present disclosure are used to distinguish between similar objects instead of describing a specific sequence or order. It should be understood that such used data is exchangeable in a proper case, so that the embodiments of the present disclosure described herein, for example, can be implemented in sequences other than those shown in the figures or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described in this specification is not limited to the long term evolution (LTE)/LTE-Advanced (LTE-A) system. It can also be applied in various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA) and other systems. The terms "system" and "network" are usually used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability; or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

Figure 1:
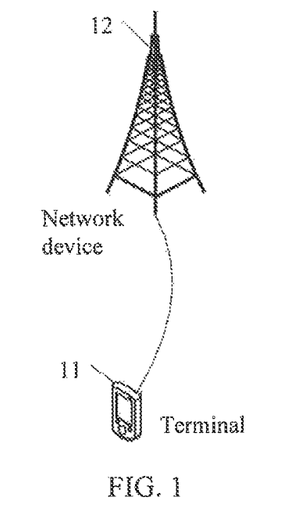
FIG. 1 is a block diagram of a mobile communications system to which an embodiment of the present disclosure can be applied.

Referring to FIG. 1, FIG. 1 is a block diagram of a wireless communications system to which an embodiment of the present disclosure can be applied. The wireless communications system includes a terminal 11 and a network device 12. The terminal 11 can also be called a terminal device or user equipment (UE), and terminal 11 may be a mobile phone, a tablet personal computer, a laptop computer, a personal digital assistant (PDA), a mobile internet device (MID), a wearable device, an on-board device or other terminal side devices. It should be noted that a specific type of the terminal 11 is not limited in embodiments of the present disclosure. The network device 12 may be a base station or a core network. The base station may be a base station of 5G or a later version (for example, gNB or 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. As long as a same technical effect is achieved, the base station is not limited to a specified technical term. It should be noted that, in embodiments of the present disclosure, only a base station in an NR system is used as an example, but a specific type of the base station is not limited.

The base station can communicate with the terminal 11 under the control of a base station controller. In various examples, the base station controller may be a part of the core network or some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on multiple carriers (waveform signals of different frequencies). A multi-carrier transmitter can simultaneously transmit a modulated signal on the multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 11 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

The communication link in the wireless communications system may include an uplink for carrying uplink (UL) transmission (for example, from the terminal 11 to the network device 12), or a downlink for carrying downlink (DL) transmission (for example, from the network device 12 to the terminal 11). The UL transmission may also be referred to as reverse link transmission and the DL transmission may also be referred to as forward link transmission.

Figure 2A:
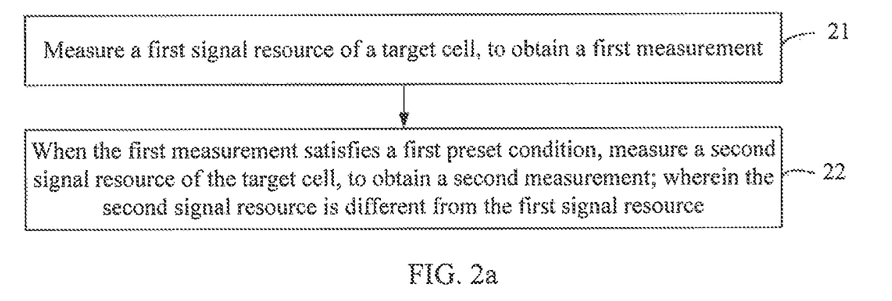
FIG. 2a is a schematic flowchart of a signal resource measurement method according to an embodiment of the present disclosure.

As shown in FIG. 2a, an embodiment of the present disclosure provides a signal resource measurement method, including step 21 and step 22.

Step 21: Measure a first signal resource of a target cell, to obtain a first measurement.

The target cell can be a serving cell or a non-serving cell. When the target cell is a serving cell, the serving cell can be a serving cell in a connected state, an idle state, or an inactive state. The non-serving cell can be a neighboring cell of the serving cell, or the like. The number of the first signal resources can be N. N is an integer greater than or equal to 1 and less than or equal to the number of signal resources configured in the target cell, that is, the terminal can measure one first signal resource of the target cell, and can also measure multiple first signal resources of the target cell. N is configured by the network device, or agreed upon by the protocol, or determined by the terminal. Each of the first signal resources corresponds to a transmission beam. The first signal resources include, but are not limited to at least one of the following: a synchronization signal broadcast block SS/PBCH block resource, a channel state information reference signal CSI-RS resource, a demodulation reference signal (DMRS) resource, a phase tracking reference signal (PTRS) resource, other reference signal resources, or the like. For example, the first signal resources may be a set of CSI-RS time-frequency resources configured by the network device. For another example, the first signal resources are two sets of SSB time-frequency resources configured by the network device. For another example, the first signal resources may be a set of CSI-RS time-frequency resources and a set of SSB time-frequency resources configured by the network device. Optionally, the first signal resource can be a periodic time-frequency resource configured by the network device, for example, the period can be 5 ms, 20 ms, 80 ms, 160 ms, or 200 ms.

Optionally, the terminal may periodically measure the first signal resource of the target cell, for example, perform measurement once at an interval of every paging cycle, or perform measurement at preset intervals (such as 200 ms). Accordingly, the first measurement (or called a first measurement result) can be the result of one measurement of the first signal resource, or the average result of multiple measurements of the first signal resource. In addition, the terminal can use different receiving beams (such as receiving beam 1, receiving beam 2, and receiving beam 3) or different panels (such as panel 1, panel 2, and panel 3) to measure the first signal resource to obtain the first measurement. The first measurement includes, but is not limited to: reference signal received power (RSRP), reference signal received quality (RSRQ), a signal to interference plus noise ratio (SINR), a reference signal status indicator (Received Signal Strength Indication, RSSI), and the like.

Optionally, after step 21, the terminal further reports the first measurement to the network device. The reported first measurement further may include an identifier and a measurement size of the first signal resource, and the like. For example, the identifier of the reported CSI-RS resource is No. 2 CRS-RS resource, and an RSRP measurement of the No. 2 CRS-RS resource is −70 dBm.

Step 22: When the first measurement satisfies a first preset condition, measure a second signal resource of the target cell, to obtain a second measurement; where the second signal resource is different from the first signal resource.

Figure 2B:
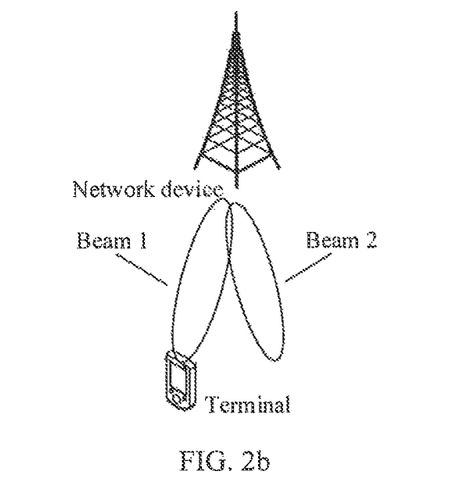
FIG. 2b is a schematic diagram of a mapping relationship between a signal resource and a beam according to an embodiment of this disclosure.

The first preset condition is: at least one first measurement is lower than a first preset threshold, for example, the RSRP, RSRQ, and/or SINR of the first signal resource is lower than a threshold. Alternatively, the first preset condition further can be: the combination of at least two first measurements satisfies a condition. For example, the combination of several of the RSRP, RSRQ, and SINR of the first signal resource satisfies a condition. It should be noted that when there is more than one first signal resource, the first preset condition is that the measurement of at least one first signal resource is lower than the first preset threshold, or the measurement of at least one first signal resource satisfies a condition. When the first measurement satisfies the first preset condition, the terminal determines that channel quality of the first signal resource is poor. In this case, the terminal measures the second signal resource of the target cell that is different from the first signal resource, to obtain the second measurement to determine whether the target cell has a signal resource with better channel quality, to ensure transmission reliability. A transmission beam corresponding to the second signal resource is different from a transmission beam corresponding to the first signal resource. For example, as shown in FIG. 2b, the target cell has two beams: beam 1 and beam 2. The beam of the first signal resource and the beam of the second signal resource are two beams of the target cell, for example, the beam of the first signal resource is beam 1, and the beam of the second signal resource is beam 2. In this way, when estimating channel quality of the target cell, the terminal does not need to measure all signal resources of the target cell, or only needs to measure the minimum number of signal resources of the target cell. This reduces the number of measured signal resources of the target cell, thereby reducing energy consumption of the terminal.

Optionally, after step 22, the terminal further reports the second measurement to the network device. The reported second measurement further may include an identifier and a measurement size of the second signal resource, and the like.

Optionally, after step 21, the method further includes: when the first measurement does not satisfy the first preset condition, another signal resource of the target cell other than the first signal resource is not measured. That is, in the embodiments of the present disclosure, the terminal only measures another signal resource (such as the second signal resource) of the target cell when the first measurement of the first signal resource satisfies the first preset condition. Otherwise, only the first signal resource is measured to reduce the number of measured signal resources, thereby reducing energy consumption of the terminal.

In an embodiment of the present disclosure, when the first measurement satisfies the first preset condition, the method further includes: removing (or deleting), from the first signal resource, at least one signal resource corresponding to the first measurement. For example, there is one first signal resource, including a resource of SS/PBCH Block 1. When the first measurement of the resource of SS/PBCH Block 1 satisfies the first preset condition, it indicates that channel quality of the resource of SS/PBCH Block 1 is poor. In this case, the resource of SS/PBCH Block 1 with poor quality can no longer be used as the first signal resource. For another example, there are three first signal resources, including a resource of SS/PBCH Block 1, a resource of SS/PBCH Block 2, and a resource of SS/PBCH Block 3. When the measurement of the resource of SS/PBCH Block 1 satisfies the first preset condition, it means that channel quality of the resource of SS/PBCH Block 1 is poor. In this case, the resource of SS/PBCH Block 1 with poor quality can be removed or deleted from the first signal resources to update the first signal resources, so that the first signal resources include only the resource of SS/PBCH Block 2 and the resource of SS/PBCH Block 3.

Optionally, after the step of removing, from the first signal resource, at least one signal resource corresponding to the first measurement, the method further includes: reporting a resource identifier and/or a measurement corresponding to the removed at least one signal resource to the network device. In addition, the terminal may further report a resource identifier and/or a measurement of a signal resource that remains after the at least one signal resource is removed to the network device. For example, there are three first signal resources, including a resource of SS/PBCH Block 1, a resource of SS/PBCH Block 2, and a resource of SS/PBCH Block 3. When the measurement of the resource of SS/PBCH Block 1 satisfies the first preset condition, it means that channel quality of the resource of SS/PBCH Block 1 is poor. In this case, the resource of SS/PBCH Block 1 with poor quality can be removed or deleted from the first signal resources. The terminal can report a resource identifier of SS/PBCH Block 1 and/or the first measurement of SS/PBCH Block 1 to the network device. Alternatively, the terminal can report resource identifiers of SS/PBCH Block 2 and SS/PBCH Block 3 and/or measurements of SS/PBCH Block 2 and SS/PBCH Block 3 to the network device.

In an embodiment of the present disclosure, after step 22, the method further includes: when the second measurement satisfies a second preset condition, determining at least one signal resource corresponding to the second measurement as the first signal resource; and measuring the first signal resource of the target cell. For example, the terminal maintains at least one first signal resource. When the measurement of the first signal resource satisfies the first preset condition, the terminal measures the second signal resource. If the measurement of the second signal resource satisfies the second preset condition, at least one second signal resource that satisfies the condition replaces a signal resource that satisfies the first preset condition among the maintained at least one first signal resource, to update the first signal resource.

The second preset condition is that at least one second measurement is higher than the second preset threshold, for example, the RSRP, RSRQ and/or SINR of the second signal resource is higher than a threshold. Alternatively, the second preset condition further can be: the combination of at least two second measurements satisfies a condition, for example, the combination of several of the RSRP, RSRQ, and SINR of the second signal resource satisfies a condition. It should be noted that when there is more than one second signal resource, the second preset condition is that the measurement of at least one second signal resource is higher than the second preset threshold, or the measurement of at least one second signal resource satisfies a condition. When the second measurement of the second signal resource satisfies the second preset condition, the terminal determines that channel quality of the second signal resource is good, and the terminal may determine at least one second signal resource with good channel quality as the first signal resource, that is, add at least one second signal resource to the first signal resource. For example, there is one first signal resource, including a resource of SS/PBCH Block 1. When the measurement of the resource of SS/PBCH Block 1 satisfies the first preset condition, it means that channel quality of the resource of SS/PBCH Block 1 is poor. In this case, the resource of SS/PBCH Block 1 with poor quality can be removed or deleted from the first signal resources. The terminal further measures the second signal resource, such as the resource of SS/PBCH Block 2, to obtain the second measurement. If the second measurement satisfies the second preset condition, channel quality of the resource of SS/PBCH Block 2 is good. In this case, the terminal can determine the resource of SS/PBCH Block 2 as a new first signal resource.

Optionally, after the step of determining at least one signal resource corresponding to the second measurement as the first signal resource, the method further includes: reporting a resource identifier and/or a measurement corresponding to the at least one signal resource determined as the first signal resource to the network device. For example, there is one first signal resource, including a resource of SS/PBCH Block 1. When the measurement of the resource of SS/PBCH Block 1 satisfies the first preset condition, it means that channel quality of the resource of SS/PBCH Block 1 is poor. In this case, the resource of SS/PBCH Block 1 with poor quality can be removed or deleted from the first signal resources. The terminal further measures the second signal resource, such as the resource of SS/PBCH Block 2, to obtain the second measurement. If the second measurement satisfies the second preset condition, channel quality of the resource of SS/PBCH Block 2 is good. In this case, the terminal can determine the resource of SS/PBCH Block 2 as a new first signal resource, and report a resource identifier of SS/PBCH Block 2 and/or the second measurement of SS/PBCH Block 2 to the network device.

Optionally, after step 21, the terminal may determine cell quality of the target cell according to the first measurement. Optionally, when the first measurement does not meet the first preset condition, the terminal determines cell quality of the target cell according to the first measurement. For example, the terminal may obtain the cell quality of the target cell by performing weighting according to weights and values of different measurements among the first measurements.

Alternatively, after step 22, the terminal may also determine the cell quality of the target cell according to both the first measurement and the second measurement. For example, the terminal may obtain the cell quality of the target cell by performing weighting according to weights and values of different measurements among the first measurements and the second measurements. Alternatively, the terminal may determine cell quality of the target cell according to the second measurement. For example, the terminal may obtain the cell quality of the target cell by performing weighting according to weights and values of different measurements among the second measurements. It should be noted that after determining the cell quality of the target cell, the terminal may also report the cell quality to the network device.

In an embodiment of the present disclosure, after the step of determining the cell quality of the target cell, the method further includes: when cell quality of the target cell satisfies a third preset condition, measuring a neighboring cell of the first signal resource, or measuring at least some signal resources of the neighboring cell of the first signal resource; where the neighboring cell of the first signal resource includes: a neighboring cell of at least one signal resource of the first signal resources.

The third preset condition is: cell quality of the target cell is lower than a third preset threshold. Optionally, the third preset condition is: at least one of measurements related to calculation of the cell quality of the target cell is lower than a preset threshold. For example, the cell quality of the target cell is related to the measurement of the second signal resource. In this case, the third preset condition may be: the RSRP, RSRQ, and/or SINR of the second signal resource is lower than a threshold. Alternatively, the third preset condition further can be: the combination of at least two second measurements satisfies a condition, for example, the combination of several of the RSRP, RSRQ, and SINR of the second signal resource satisfies a condition. It should be noted that when there is more than one second signal resource, the third preset condition is that the measurement of at least one second signal resource is lower than the third preset threshold, or the measurement of at least one second signal resource satisfies a condition. When the second measurement of the second signal resource satisfies the third preset condition, the terminal determines that the channel quality of the second signal resource is poor, that is, the channel quality of all signal resources of the target cell is not ideal. In this case, the terminal may measure the neighboring cell of the first signal resource, or measure at least some signal resources of the neighboring cell, to ensure transmission reliability.

Correspondingly, before the step of measuring the neighboring cell of the first signal resource by the terminal, the method further includes: receiving a neighboring cell list of the first signal resource; where the neighboring cell list includes: a neighboring cell identifier corresponding to at least one signal resource of the first signal resources. Optionally, each of the first signal resources corresponds to a beam direction, and a neighboring cell corresponding to the beam direction or a cell adjacent to the beam direction is a neighboring cell corresponding to at least one signal resource of the first signal resources. The network device configures a neighbor cell list of each signal resource (or called a beam) of the target cell for the terminal, and the neighbor cell list of each signal resource may be an ID (cell ID) of a neighbor cell that is geographically adjacent to the signal resource. When the first measurement of the first signal resource of the terminal in the target cell satisfies the first preset condition and the second measurement of the second signal resource of the target cell satisfies the third preset condition, the terminal further measures a cell in the neighbor cell list corresponding to the first signal resource.

Correspondingly, before the step of measuring at least some signal resources of the neighboring cell of the first signal resource by the terminal, the method further includes: receiving a first configuration list of the neighboring cell of the first signal resource, where the first configuration list includes: a resource identifier of at least one signal resource corresponding to the neighboring cell. The network device sends multiple signal resource identifiers (such as beam identifiers) corresponding to the neighboring cell of each signal resource of the target cell to the terminal. The multiple signal resource identifiers corresponding to the neighboring cell of each signal resource may be signal resource identifiers corresponding to the neighboring cell that is adjacent to a beam or a geographic location of the signal resource. When the first measurement of the first signal resource of the terminal in the target cell satisfies the first preset condition and the second measurement of the second signal resource of the target cell satisfies the third preset condition, the terminal further measures at least one signal resource corresponding to the neighbor cell corresponding to the first signal resource.

In an embodiment of the present disclosure, before step 21, the method further includes: receiving a second configuration list of the target cell, where the second configuration list includes: a resource identifier of at least one signal resource corresponding to the target cell; measuring the at least one signal resource, to obtain a third measurement; and when the third measurement satisfies a fourth preset condition, determining at least one signal resource satisfying the fourth preset condition as the first signal resource. When the terminal measures a target cell, at the initial stage, the terminal can measure all signal resources of the target cell to obtain the third measurements. If there is a signal resource whose third measurement satisfies a fourth preset condition, the terminal determines at least one signal resource satisfying the fourth preset condition as the first signal resource. The fourth preset condition is that at least one third measurement is higher than the fourth preset threshold, for example, the RSRP, RSRQ and/or SINR of at least one signal resource of the target cell is higher than a threshold. Alternatively, the fourth preset condition further can be: the combination of at least two third measurements satisfies a condition. For example, the combination of several of the RSRP, RSRQ, and SINR of at least one signal resource of the target cell satisfies a condition.

Optionally, after the step of determining at least one signal resource satisfying the fourth preset condition as the first signal resource, the method further includes: reporting a resource identifier and/or a measurement of the first signal resource to the network device. For example, there are three first signal resources, including a resource of SS/PBCH Block 1, a resource of SS/PBCH Block 2, and a resource of SS/PBCH Block 3. When the measurement of the resource of SS/PBCH Block 1 satisfies the fourth preset condition, it means that channel quality of the resource of SS/PBCH Block 1 is good. In this case, the resource of SS/PBCH Block 1 with good quality can be used as the first signal resource. A resource identifier of SS/PBCH Block 1 and/or the measurement of SS/PBCH Block 1 are reported to the network device.

It should be noted that in the embodiment of the present disclosure, in the process of reporting the measurement of the first signal resource (such as the first measurement), the measurement of the second signal resource (such as the second measurement), the measurement of the signal resource of the target cell (such as the third measurement), the measurement of the signal resource removed from the first signal resources, the measurement of the signal resource added to the first signal resources, and the like to the network device, the terminal may also report related information of these measurements, such as identifiers of the signal resources and values of the measurements of the signal resources.

It should be noted that the thresholds corresponding to the preset conditions (such as the first preset condition, the second preset condition, the third preset condition, and the fourth preset condition) in the embodiments of the present disclosure may be the same or different.

In the signal resource measurement method, when the terminal of the embodiments of the present disclosure measures the target cell, the terminal first measures the first signal resource of the target cell. Only when the measurement of the first signal resource satisfies the preset condition, the terminal measures the second signal resource of the target cell. If the measurement of the first signal resource does not satisfy the preset condition, there is no need to measure another signal resource. This can reduce the number of measured signal resources of the target cell, thereby reducing energy consumption of the terminal.

The foregoing embodiments describe the signal resource measurement methods in different scenarios. The following further describes the corresponding terminal with reference to the accompanying drawings.

Figure 3:
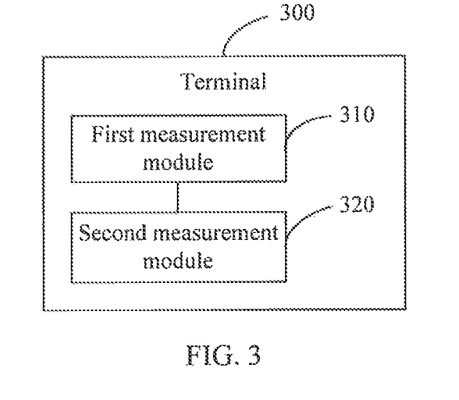
FIG. 3 is a schematic structural diagram of modules of a terminal according to an embodiment of the present disclosure.

As shown in FIG. 3, the terminal 300 of the embodiments of the present disclosure can implement details of the method in the foregoing embodiments: measuring a first signal resource of a target cell, to obtain a first measurement; and when the first measurement satisfies a first preset condition, measuring a second signal resource of the target cell, to obtain a second measurement; where the second signal resource is different from the first signal resource. The same effect is achieved, and the terminal 300 specifically includes the following functional modules:

a first measurement module 310, configured to measure a first signal resource of a target cell, to obtain a first measurement; and a second measurement module 320, configured to: when the first measurement satisfies a first preset condition, measure a second signal resource of the target cell, to obtain a second measurement; where the second signal resource is different from the first signal resource.

The terminal 300 further includes:

a first processing module, configured to: when the first measurement satisfies a first preset condition, remove, from the first signal resource, at least one signal resource corresponding to the first measurement.

The terminal 300 further includes:

a first reporting module, configured to report a resource identifier and/or a measurement corresponding to the removed at least one signal resource to a network device.

The first preset condition is: at least one first measurement is lower than a first preset threshold.

The terminal 300 further includes:

a first determining module, configured to: when the second measurement satisfies a second preset condition, determine at least one signal resource corresponding to the second measurement as the first signal resource; and a second processing module, configured to measure the first signal resource of the target cell.

The terminal 300 further includes:

a second reporting module, configured to report a resource identifier and/or a measurement corresponding to the at least one signal resource determined as the first signal resource to the network device.

The second preset condition is: at least one second measurement is higher than a second preset threshold.

The terminal 300 further includes:

a third reporting module, configured to report the first measurement to the network device;

and/or a fourth reporting module, configured to report the second measurement to the network device.

The terminal 300 further includes:

a first calculating module, configured to determine cell quality of the target cell according to the first measurement.

The terminal 300 further includes:

a second calculating module, configured to determine cell quality of the target cell according to the first measurement and the second measurement, or according to the second measurement.

The terminal 300 further includes:

a third measuring module, configured to: when cell quality of the target cell satisfies a third preset condition, measure a neighboring cell of the first signal resource, or measure at least some signal resources of the neighboring cell of the first signal resource; where the neighboring cell of the first signal resource includes: a neighboring cell of at least one signal resource of the first signal resources.

The terminal 300 further includes:

a first receiving module, configured to receive a neighboring cell list of the first signal resource; where the neighboring cell list includes: a neighboring cell identifier corresponding to at least one signal resource of the first signal resources.

The terminal 300 further includes:

a second receiving module, configured to receive a first configuration list of the neighboring cell of the first signal resource, where the first configuration list includes: a resource identifier of at least one signal resource corresponding to the neighboring cell.

The third preset condition is: cell quality of the target cell is lower than a third preset threshold.

The terminal 300 further includes:

a third receiving module, configured to receive a second configuration list of the target cell, where the second configuration list includes: a resource identifier of at least one signal resource corresponding to the target cell;

a fourth measuring module, configured to measure the at least one signal resource, to obtain a third measurement; and a second determining module, configured to: when the third measurement satisfies a fourth preset condition, determine at least one signal resource satisfying the fourth preset condition as the first signal resource.

The terminal 300 further includes:

a fifth reporting module, configured to report a resource identifier and/or a measurement of the first signal resource to the network device.

The fourth preset condition is: at least one third measurement is higher than a fourth preset threshold.

The first measurement includes: at least one of reference signal received power RSRP, reference signal received quality RSRQ, or a signal-to-interference plus noise ratio SINR; and the second measurement includes: at least one of RSRP, RSRQ, or an SINR.

The first signal resource includes: at least one of a synchronization signal broadcast block resource or a channel state information reference signal CSI-RS resource; and the second signal resource includes: at least one of a synchronization signal broadcast block resource or a CSI-RS resource.

It should be noted that when the terminal of the embodiments of the present disclosure measures the target cell, the terminal first measures the first signal resource of the target cell. Only when the measurement of the first signal resource satisfies the preset condition, the terminal measures the second signal resource of the target cell. If the measurement of the first signal resource does not satisfy the preset condition, there is no need to measure another signal resource. This can reduce the number of measured signal resources of the target cell, thereby reducing energy consumption of the terminal.

It should be noted that, division of the modules of the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementations of other modules are similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or indications in the form of software.

For example, the above modules can be configured into one or more integrated circuits to perform the above methods, such as: one or more application specific integrated circuits (ASIC), one or more microprocessors (digital signal processor, DSP), one or more field programmable gate arrays (FPGA), or the like. For another example, when one of the above modules is implemented in a manner in which a processing element schedules program code, the processing element can be a general-purpose processor, such as a central processing unit (CPU) or other processor that can invoke the program code. For another example, these modules may be integrated together, and implemented in a form of a system-on-a-chip (SOC).

Figure 4:
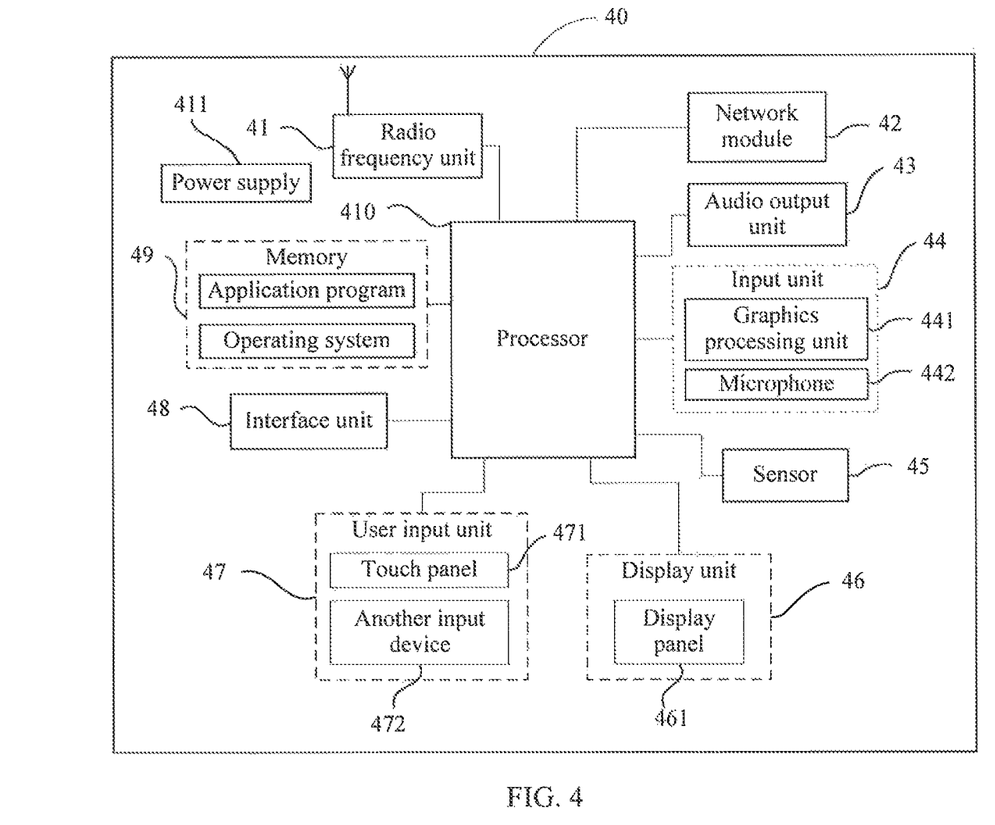
FIG. 4 is a block diagram of a terminal according to an embodiment of the present disclosure.

To better achieve the foregoing objective, further, FIG. 4 is a schematic structural diagram of hardware of a terminal for implementing the various embodiments of this disclosure. The terminal 40) includes, but is not limited to: components such as a radio frequency unit 41, a network module 42, an audio output unit 43, an input unit 44, a sensor 45, a display unit 46, a user input unit 47, an interface unit 48, a memory 49, a processor 410, and a power supply 411. It may be understood by persons skilled in the art that, the terminal structure shown in FIG. 4 does not constitute any limitation on the terminal, and the terminal may include more or fewer components than those shown in the figure, or combine some components, or have different component arrangements. In the embodiments of the present disclosure, the terminal includes, but not limited to, a mobile phone, a tablet computer, a notebook computer, a palmtop computer, a vehicle-mounted terminal, a wearable device, and a pedometer.

The radio frequency unit 41 is configured to receive and send data under control of the processor 410.

The processor 410 is configured to: measure a first signal resource of a target cell, to obtain a first measurement; and when the first measurement satisfies a first preset condition, measure a second signal resource of the target cell, to obtain a second measurement; where the second signal resource is different from the first signal resource.

When the terminal of the embodiments of the present disclosure measures the target cell, the terminal first measures the first signal resource of the target cell. Only when the measurement of the first signal resource satisfies the preset condition, the terminal measures the second signal resource of the target cell. If the measurement of the first signal resource does not satisfy the preset condition, there is no need to measure another signal resource. This can reduce the number of measured signal resources of the target cell, thereby reducing energy consumption of the terminal.

It should be understood that, in this embodiment of the present disclosure, the radio frequency unit 41 may be configured to receive and transmit information, or receive and transmit signals during a call. Optionally; the radio frequency unit 41 receives downlink data from a base station, and transmits the downlink data to the processor 410 for processing; and in addition, transmits uplink data to the base station. Usually, the radio frequency unit 41 includes but is not limited to an antenna, at least one amplifier, a transceiver, a coupler, a low noise amplifier, a duplexer, and the like. In addition, the radio frequency unit 41 may further communicate with another device by using a wireless communication system and network.

The terminal provides wireless broadband Internet access for a user by using the network module 42, for example, helps the user send and receive an email, browse a web page, and access streaming media.

The audio output unit 43 can convert audio data received by the radio frequency unit 41 or the network module 42 or stored in the memory 49 into an audio signal, and output the audio signal as sound. In addition, the audio output unit 43 can also provide audio output related to a specific function performed by the terminal 40 (for example, call signal receiving sound or message receiving sound). The audio output unit 43 includes a speaker, a buzzer, a telephone receiver, and the like.

The input unit 44 is configured to receive audio or video signals. The input unit 44 may include a graphics processing unit (GPU) 441 and a microphone 442. The graphics processing unit 441 processes image data of a static image or a video obtained by an image capturing apparatus (such as, a camera) in a video capturing mode or an image capturing mode. A processed image frame may be displayed on the display unit 46. An image frame processed by the graphics processing unit 441 may be stored in the memory 49 (or another storage medium) or sent by the radio frequency unit 41 or the network module 42. The microphone 442 may receive a sound and can process such sound into audio data. The audio data obtained through processing may be converted, in a telephone call mode, into a format that can be sent to a mobile communications base station via the radio frequency unit 41 for output.

The terminal 40 further includes at least one type of sensor 45, such as a light sensor, a motion sensor, and another sensor. Optionally, the light sensor includes an ambient light sensor and a proximity sensor, where the ambient light sensor can adjust brightness of the display panel 461 based on brightness of ambient light, and the proximity sensor can turn off the display panel 461 and/or backlight when the terminal 40 moves towards the ear. As a type of the motion sensor, an accelerometer sensor may detect an acceleration value in each direction (generally, three axes), and detect a value and a direction of gravity when the accelerometer sensor is static, and may be used in an application for recognizing a terminal posture (such as screen switching between landscape and portrait modes, a related game, or magnetometer posture calibration), a function related to vibration recognition (such as a pedometer or a knock), and the like. The sensor 45 may further include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information entered by a user or information provided for a user. The display unit 46 may include a display panel 461, and the display panel 461 may be configured in a form of a liquid crystal display (LCD), an organic light-emitting diode (OLED), or the like.

The user input unit 47 may be configured to receive input numeral or character information, and generate key signal input related to user setting and function control of the terminal. Optionally, the user input unit 47 includes a touch panel 471 and another input device 472. The touch panel 471, also called a touch screen, may collect a touch operation of the user on or near the touch panel 471 (for example, an operation performed by the user with any suitable object or accessory such as a finger or a stylus on or near the touch panel 471). The touch panel 471 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 410, and receives and executes a command sent by the processor 410. In addition, the touch panel 471 can be implemented in various types such as resistive, capacitive, infrared, and a surface acoustic wave. In addition to the touch panel 471, the user input unit 47 may further include the another input device 472. Optionally; the another input device 472 may include but is not limited to a physical keyboard, a function key (such as a volume control key or an on/off key), a trackball, a mouse, a joystick, and the like. Details are not described herein.

Further, the touch panel 471 may cover the display panel 461. When detecting a touch operation on or near the touch panel 471, the touch panel 471 transmits the touch operation to the processor 410 to determine a type of a touch event. Then, the processor 410 provides corresponding visual output on the display panel 461 based on the type of the touch event. Although in FIG. 4, the touch panel 471 and the display panel 461 implement input and output functions of the terminal as two independent components, in some embodiments, the touch panel 471 and the display panel 461 may be integrated to implement the input and output functions of the terminal. This is not specifically limited herein.

The interface unit 48 is an interface for connecting an external apparatus to the terminal 40. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 48 may be configured to receive input (for example, data information and power) from the external apparatus and transmit the received input to one or more elements in the terminal 40, or may be configured to transmit data between the terminal 40 and the external apparatus.

The memory 49 may be configured to store a software program and various data. The memory 49 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 49 may include a high-speed random access memory or a nonvolatile memory, for example, at least one magnetic disk storage device, a flash memory device, or another volatile solid-state storage device.

The processor 410 is a control center of the terminal, and connects all parts of the entire terminal by using various interfaces and lines. By running or executing a software program and/or a module stored in the memory 49 and invoking data stored in the memory 49, the processor 410 performs various functions of the terminal and data processing, to perform overall monitoring on the terminal. The processor 410 may include one or more processing units. Optionally, the processor 410 may integrate an application processor and a modem processor. The application processor mainly deals with an operating system, a user interface, an application program, and the like. The modem processor mainly deals with wireless communication. It may be understood that alternatively; the modem processor may not be integrated into the processor 410.

The terminal 40 may further include a power supply 411 (such as a battery) that supplies power to each component. Optionally, the power supply 411 may be logically connected to the processor 410 by using a power management system, to implement functions such as charging, discharging, and power consumption management by using the power management system.

In addition, the terminal 40 includes some function modules not shown, and details are not described herein again.

Optionally, an embodiment of the present disclosure further provides a terminal, including a processor 410, a memory 49, and a computer program stored in the memory 49 and executable on the processor 410. When the computer program is executed by the processor 410, each process of the foregoing embodiments of the signal resource measurement method can be implemented, and a same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "Cellular" phone) and a computer with a mobile terminal, and may be, for example, a portable, pocket-sized, handheld, computer built-in, or vehicle-mounted mobile apparatus, which exchange language and/or data with a radio access network. For example, the wireless terminal is a device such as a personal communication service (PCS) telephone, a cordless telephone, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or a user device (User Device or User Equipment). This is not limited herein.

An embodiment of the present disclosure further provides a computer-readable storage medium. A computer program is stored in the computer-readable storage medium. When being executed by a processor, the computer program implements each process of the foregoing embodiment of the signal resource measurement method, and a same technical effect can be achieved. To avoid repetition, details are not described herein. The computer-readable storage medium includes a read-only memory (ROM), a random access memory (RAM), a magnetic disk, an optical disc, or the like.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely; for a specific working process of the system, apparatus, and unit described above, refer to the corresponding process in the foregoing method embodiments. Details are not described herein again.

In the embodiments provided by this disclosure, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatuses and methods of this disclosure, it is obvious that the components or the steps may be divided and/or recombined. These divisions and/or re-combinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of this disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of this disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These divisions and/or re-combinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The optional implementations of this disclosure are described above. It should be noted that persons of ordinary skill in the technical field may further make several improvements and refinements without departing from the principles described in this disclosure, and these improvements and refinements also fall within the protection scope of this disclosure.

The invention claimed is:

1. A signal resource measurement method, comprising:
   measuring, by a terminal, a first signal resource of a target cell, to obtain a first measurement; and
   when the first measurement satisfies a first preset condition, measuring, by the terminal, a second signal resource of the target cell, to obtain a second measurement; wherein the second signal resource is different from the first signal resource;
   wherein after the step of measuring a first signal resource of the target cell, to obtain a first measurement, the method further comprises:
   determining, by the terminal, cell quality of the target cell according to the first measurement; and
   wherein after the step of determining cell quality of the target cell, the method further comprises:
   when cell quality of the target cell satisfies a second preset condition, measuring, by the terminal, a neighboring cell of the first signal resource, or measuring, by the terminal, at least some signal resources of the neighboring cell of the first signal resource; wherein the neighboring cell of the first signal resource comprises: a neighboring cell of at least one signal resource of the first signal resources.

2. The signal resource measurement method according to claim 1, when the first measurement satisfies the first preset condition, further comprising:
   removing, by the terminal, from the first signal resource, at least one signal resource corresponding to the first measurement.

3. The signal resource measurement method according to claim 2, after the step of removing, from the first signal resource, at least one signal resource corresponding to the first measurement, further comprising:
   reporting, by the terminal, a resource identifier and/or a measurement corresponding to the removed at least one signal resource to a network device.

4. The signal resource measurement method according to claim 1, wherein the first preset condition is: at least one first measurement is lower than a first preset threshold.

5. The signal resource measurement method according to claim 1, after the step of measuring a second signal resource of the target cell, to obtain a second measurement, further comprising:
   when the second measurement satisfies a third preset condition, determining, by the terminal, at least one signal resource corresponding to the second measurement as the first signal resource; and
   measuring, by the terminal, the first signal resource of the target cell.

6. The signal resource measurement method according to claim 5, after the step of determining at least one signal resource corresponding to the second measurement as the first signal resource, further comprising:
   reporting, by the terminal, a resource identifier and/or a measurement corresponding to the at least one signal resource determined as the first signal resource to the network device.

7. The signal resource measurement method according to claim 5, wherein the third preset condition is: at least one second measurement is higher than a second preset threshold.

8. The signal resource measurement method according to claim 1, after the step of measuring a first signal resource of the target cell, to obtain a first measurement, further comprising:
   reporting, by the terminal, the first measurement to the network device; and/or
   after the step of measuring a second signal resource of the target cell, to obtain a second measurement, further comprising:
   reporting, by the terminal, the second measurement to the network device.

9. The signal resource measurement method according to claim 1, after the step of measuring a second signal resource of the target cell, to obtain a second measurement, further comprising:
   determining, by the terminal, cell quality of the target cell according to the first measurement and the second measurement, or according to the second measurement.

10. The signal resource measurement method according to claim 1, before the step of measuring a neighboring cell of the first signal resource, further comprising:
   receiving, by the terminal, a neighboring cell list of the first signal resource; wherein the neighboring cell list comprises: a neighboring cell identifier corresponding to at least one signal resource of the first signal resources.

11. The signal resource measurement method according to claim 1, before the step of measuring at least some signal resources of the neighboring cell of the first signal resource, further comprising:
   receiving, by the terminal, a first configuration list of the neighboring cell of the first signal resource, wherein the first configuration list comprises: a resource identifier of at least one signal resource corresponding to the neighboring cell.

12. The signal resource measurement method according to claim 1, wherein the second preset condition is: cell quality of the target cell is lower than a second preset threshold.

13. The signal resource measurement method according to claim 1, before the step of measuring a first signal resource of a target cell, further comprising:
   receiving, by the terminal, a second configuration list of the target cell, wherein the second configuration list comprises: a resource identifier of at least one signal resource corresponding to the target cell;
   measuring, by the terminal, the at least one signal resource, to obtain a third measurement; and
   when the third measurement satisfies a fourth preset condition, determining, by the terminal, at least one signal resource satisfying the fourth preset condition as the first signal resource.

14. The signal resource measurement method according to claim 13, after the step of determining at least one signal resource satisfying the fourth preset condition as the first signal resource, further comprising:
   reporting, by the terminal, a resource identifier and/or a measurement of the first signal resource to the network device.

15. The signal resource measurement method according to claim 13, wherein the fourth preset condition is: at least one third measurement is higher than a fourth preset threshold.

16. The signal resource measurement method according to claim 1, wherein:
   the first measurement comprises: at least one of reference signal received power (RSRP), reference signal received quality (RSRQ), or a signal-to-interference plus noise ratio (SINR); and the second measurement comprises: at least one of RSRP, RSRQ, or an SINR; and/or,
   the first signal resource comprises: at least one of a synchronization signal broadcast block resource or a channel state information reference signal (CSI-RS) resource; and the second signal resource comprises: at least one of a synchronization signal broadcast block resource or a CSI-RS resource.

17. A terminal, comprising a processor, a memory, and a program stored in the memory and executable on the processor, wherein the program, when executed by the processor, implements the following steps:
   measuring a first signal resource of a target cell, to obtain a first measurement; and
   when the first measurement satisfies a first preset condition, measuring a second signal resource of the target cell, to obtain a second measurement; wherein the second signal resource is different from the first signal resource;
   wherein after the step of measuring a first signal resource of the target cell, to obtain a first measurement, the method further comprises:
   determining, by the terminal, cell quality of the target cell according to the first measurement; and wherein after the step of determining cell quality of the target cell, the method further comprises:

when cell quality of the target cell satisfies a second preset condition, measuring, by the terminal, a neighboring cell of the first signal resource, or measuring, by the terminal, at least some signal resources of the neighboring cell of the first signal resource; wherein the neighboring cell of the first signal resource comprises: a neighboring cell of at least one signal resource of the first signal resources.

18. The terminal according to claim 17, wherein when the first measurement satisfies the first preset condition, the program further implements the following step:

removing, by the terminal, from the first signal resource, at least one signal resource corresponding to the first measurement.

19. The terminal according to claim 18, wherein after the step of removing, from the first signal resource, at least one signal resource corresponding to the first measurement, the program further implements the following step:

reporting, by the terminal, a resource identifier and/or a measurement corresponding to the removed at least one signal resource to a network device.

20. A non-transitory computer-readable storage medium, wherein the non-transitory computer-readable storage medium stores a program, and the program, when executed by a processor, implements the following steps:

measuring a first signal resource of a target cell, to obtain a first measurement; and when the first measurement satisfies a first preset condition, measuring a second signal resource of the target cell, to obtain a second measurement; wherein the second signal resource is different from the first signal resource;

wherein after the step of measuring a first signal resource of the target cell, to obtain a first measurement, the method further comprises:

determining, by the terminal, cell quality of the target cell according to the first measurement; and wherein after the step of determining cell quality of the target cell, the method further comprises:

when cell quality of the target cell satisfies a second preset condition, measuring, by the terminal, a neighboring cell of the first signal resource, or measuring, by the terminal, at least some signal resources of the neighboring cell of the first signal resource; wherein the neighboring cell of the first signal resource comprises: a neighboring cell of at least one signal resource of the first signal resources.

\* \* \* \* \*